United States Patent
Newsome

(10) Patent No.: US 10,633,834 B2
(45) Date of Patent: Apr. 28, 2020

(54) RAIN COLLECTING SCULPTURE

(71) Applicant: Allison L. Newsome, Warren, RI (US)

(72) Inventor: Allison L. Newsome, Warren, RI (US)

( * ) Notice: Subject to any disclaimer, the term of this patent is extended or adjusted under 35 U.S.C. 154(b) by 113 days.

(21) Appl. No.: 15/925,236

(22) Filed: Mar. 19, 2018

(65) Prior Publication Data
US 2018/0266086 A1    Sep. 20, 2018

Related U.S. Application Data

(60) Provisional application No. 62/473,691, filed on Mar. 20, 2017.

(51) Int. Cl.
| E03B 3/02 | (2006.01) |
|---|---|
| B67C 11/02 | (2006.01) |
| B65D 39/00 | (2006.01) |
| E03B 3/03 | (2006.01) |
| E03B 1/04 | (2006.01) |

(52) U.S. Cl.
CPC .............. *E03B 3/02* (2013.01); *B67C 11/02* (2013.01); *B65D 39/0041* (2013.01); *E03B 3/03* (2013.01); *E03B 2001/047* (2013.01); *Y02A 20/108* (2018.01); *Y10T 137/7039* (2015.04)

(58) Field of Classification Search
CPC ...... E03B 3/02; E03B 3/03; E03B 2001/0047; Y10T 137/7039
See application file for complete search history.

(56) References Cited

U.S. PATENT DOCUMENTS

| | | | | |
|---|---|---|---|---|
| 1,808,484 | A * | 6/1931 | Ward | B65D 39/00 220/801 |
| 4,948,340 | A * | 8/1990 | Solomon | F04B 49/04 137/376 |
| 5,172,718 | A * | 12/1992 | Thornburgh | B67C 11/04 137/312 |
| 6,436,283 | B1 * | 8/2002 | Duke | E03B 3/02 210/172.1 |
| 2007/0289667 | A1 * | 12/2007 | Hennessy | E03B 3/02 141/312 |
| 2009/0065504 | A1 * | 3/2009 | Vos | A01G 27/06 220/212 |
| 2011/0132823 | A1 * | 6/2011 | Brown | E03B 3/02 210/170.03 |
| 2012/0017996 | A1 * | 1/2012 | Wenger | E03B 3/03 137/1 |
| 2015/0021247 | A1 * | 1/2015 | Lin-Hendel | E03B 1/041 210/143 |
| 2017/0332564 | A1 * | 11/2017 | Wales | B67C 11/00 |

FOREIGN PATENT DOCUMENTS

WO    WO-2015130052 A1 *    9/2015    ............... E03B 3/02

* cited by examiner

*Primary Examiner* — Mary E McManmon
*Assistant Examiner* — Richard K. Durden
(74) *Attorney, Agent, or Firm* — Adler Pollock & Sheehan P.C.

(57) ABSTRACT

An apparatus for a rain collecting sculpture. An apparatus includes a base member having opposing retaining walls and providing at least a support structure, the base member configured to store collected rainwater, an elongated neck member linked to and extending perpendicularly from the base member, and petal members linked to a top of the elongated neck member, the elongated neck member running along a central longitudinal axis between the base member and the petal members.

9 Claims, 7 Drawing Sheets

RAIN COLLECTING SCULPTURE

CROSS REFERENCE TO RELATED APPLICATIONS

This application claims benefit from U.S. Provisional Patent Application Ser. No. 62/473,691, filed Mar. 20, 2017, which is incorporated by reference in its entirety.

STATEMENT REGARDING GOVERNMENT INTEREST

None.

BACKGROUND OF THE INVENTION

The invention generally relates to devices for catching and storing rain water, and more particularly to a rain collecting sculpture.

In general, water scarcity is a known and growing problem around the world. As a result of droughts, irrigation, population growth, and other factors, fewer and fewer people have access to enough water to meet their water needs.

Various water collection systems have been employed to preserve rainwater. For example, rainwater barrels are sometimes employed to collect and store rainwater. However, to achieve a collection range beyond the area of the barrel itself, rain barrels must be connected to a wider structure, such as a house, from which rainwater can be diverted into the rain barrel. Therefore rain barrels are not effective when set in an open area, apart from any other structure. Further, hooking a rain barrel up to a house also results in leaves and other debris running off the house and into the barrel, unless additional filtration steps are taken. The rain barrel also suffers from the additional problem of being unappealing to look at.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides an apparatus for a rain collecting sculpture.

In general, in one aspect, the invention features an apparatus including a base member having opposing retaining walls and providing at least a support structure, the base member configured to store collected rainwater, an elongated neck member linked to and extending perpendicularly from the base member, and petal members linked to a top of the elongated neck member, the elongated neck member running along a central longitudinal axis between the base member and the petal members.

In another aspect, the invention features an apparatus including a base forming a water tight rainwater storage container, an elongated neck portion running along a central longitudinal axis and capable of directing rainwater into the base, petal members forming channels for directing rainwater towards the central longitudinal axis and into the elongated neck, an upper surface member running perpendicular to the central longitudinal axis and having central holes, guide arms extending upward from the upper surface member along the central longitudinal axis for directing rainwater towards the surface of the upper surface member, and at least one rain chain running along the central longitudinal axis between the upper surface and the elongated neck to direct rainwater into the elongated neck.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
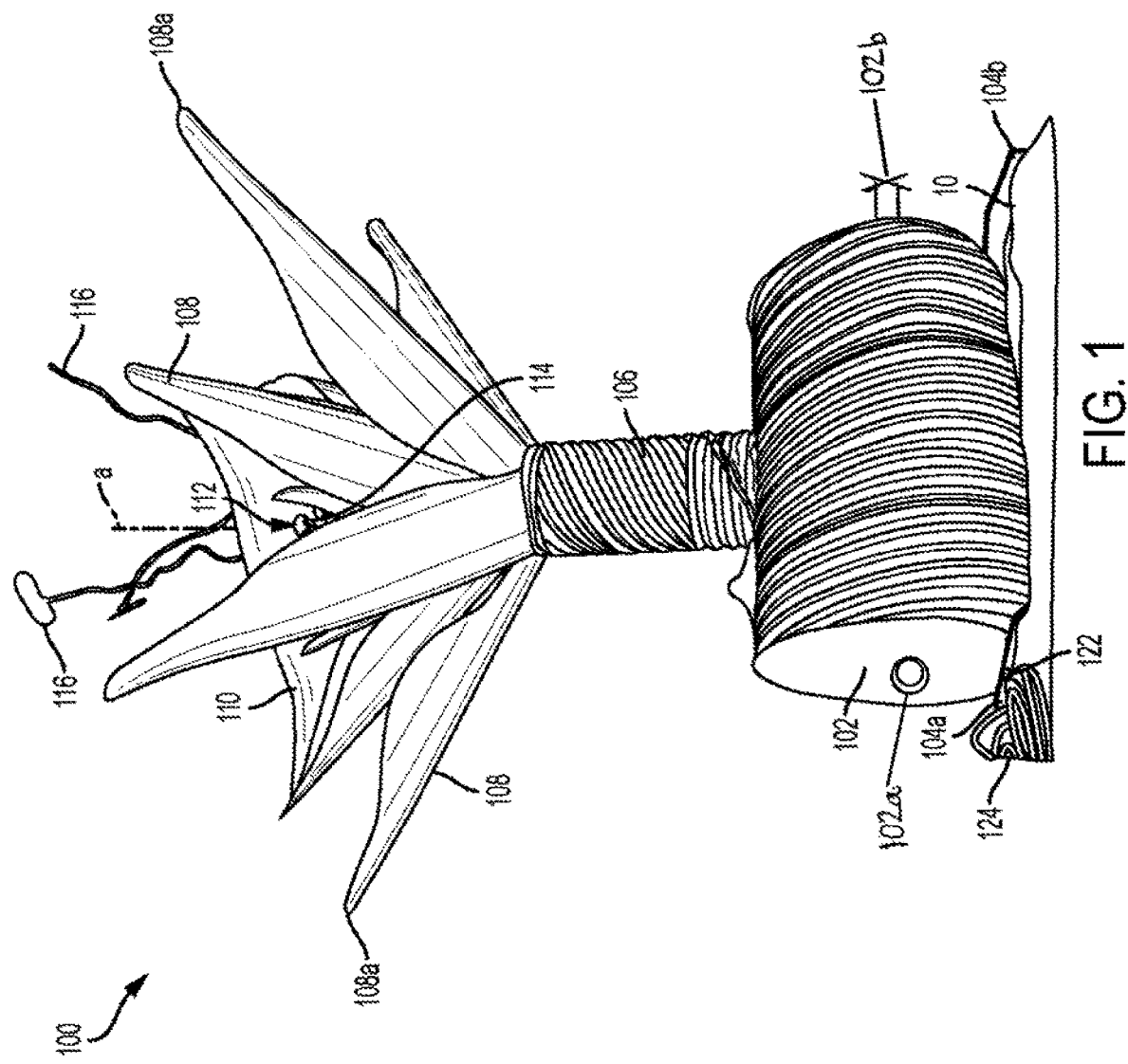
FIG. 1 is a perspective view of a rain collecting sculpture in accordance with the subject disclosure.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Figure 2:
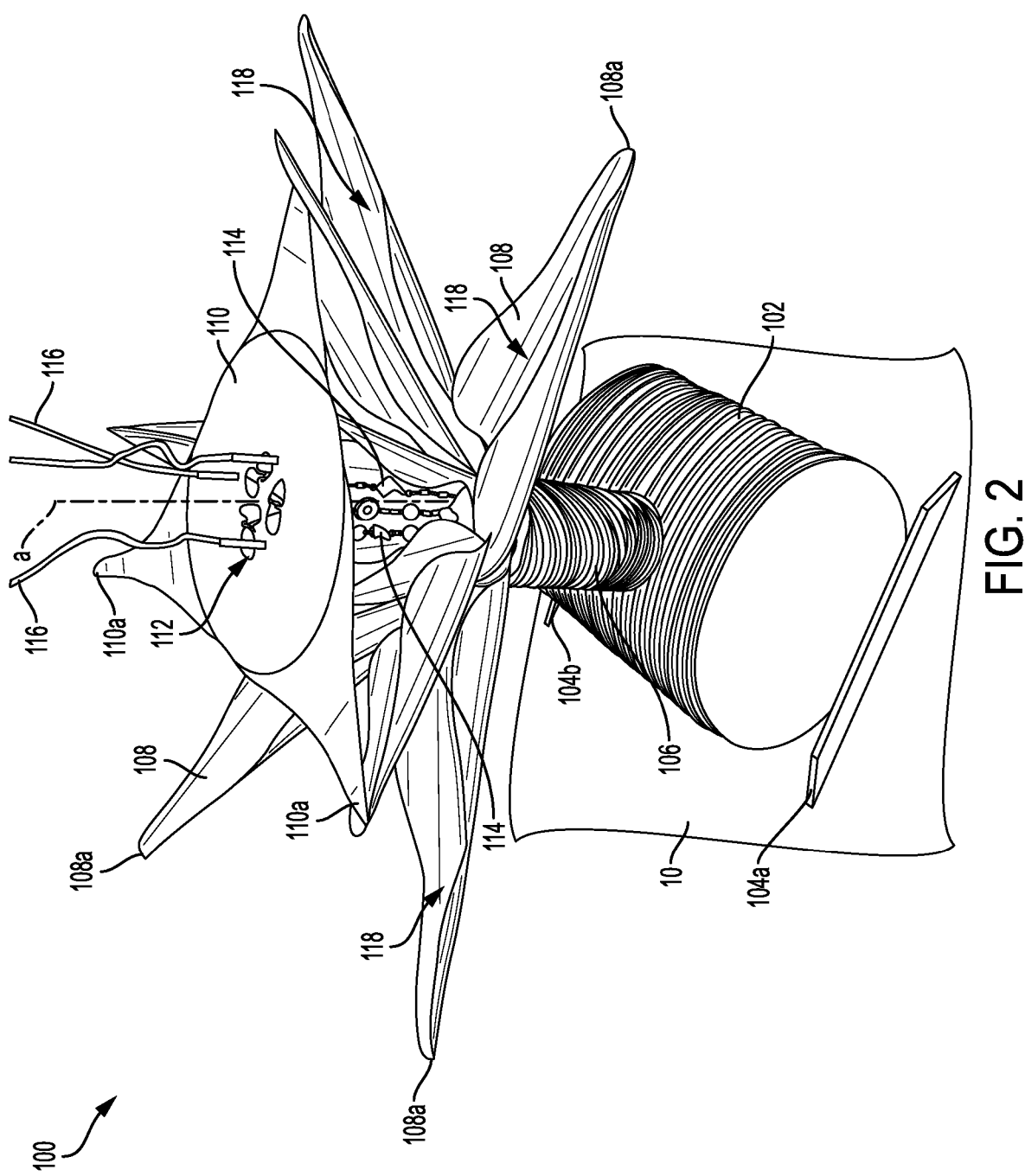
FIG. 2 is another perspective view of a rain collecting sculpture in accordance with the subject disclosure.
Figure 3:
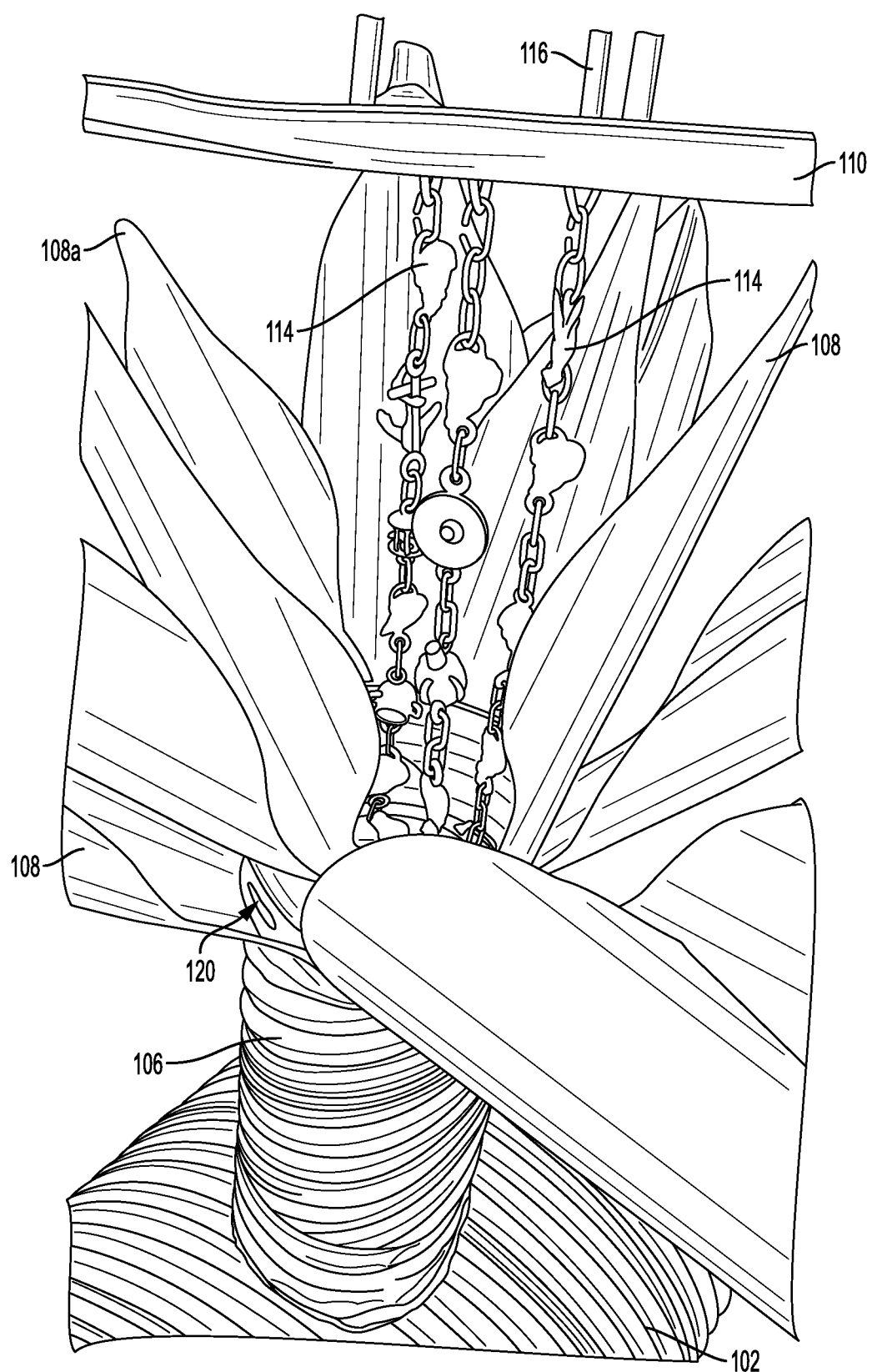
FIG. 3 is a perspective view of a portion of a rain collecting sculpture in accordance with the subject disclosure, zoomed in over the petals.
Figure 4:
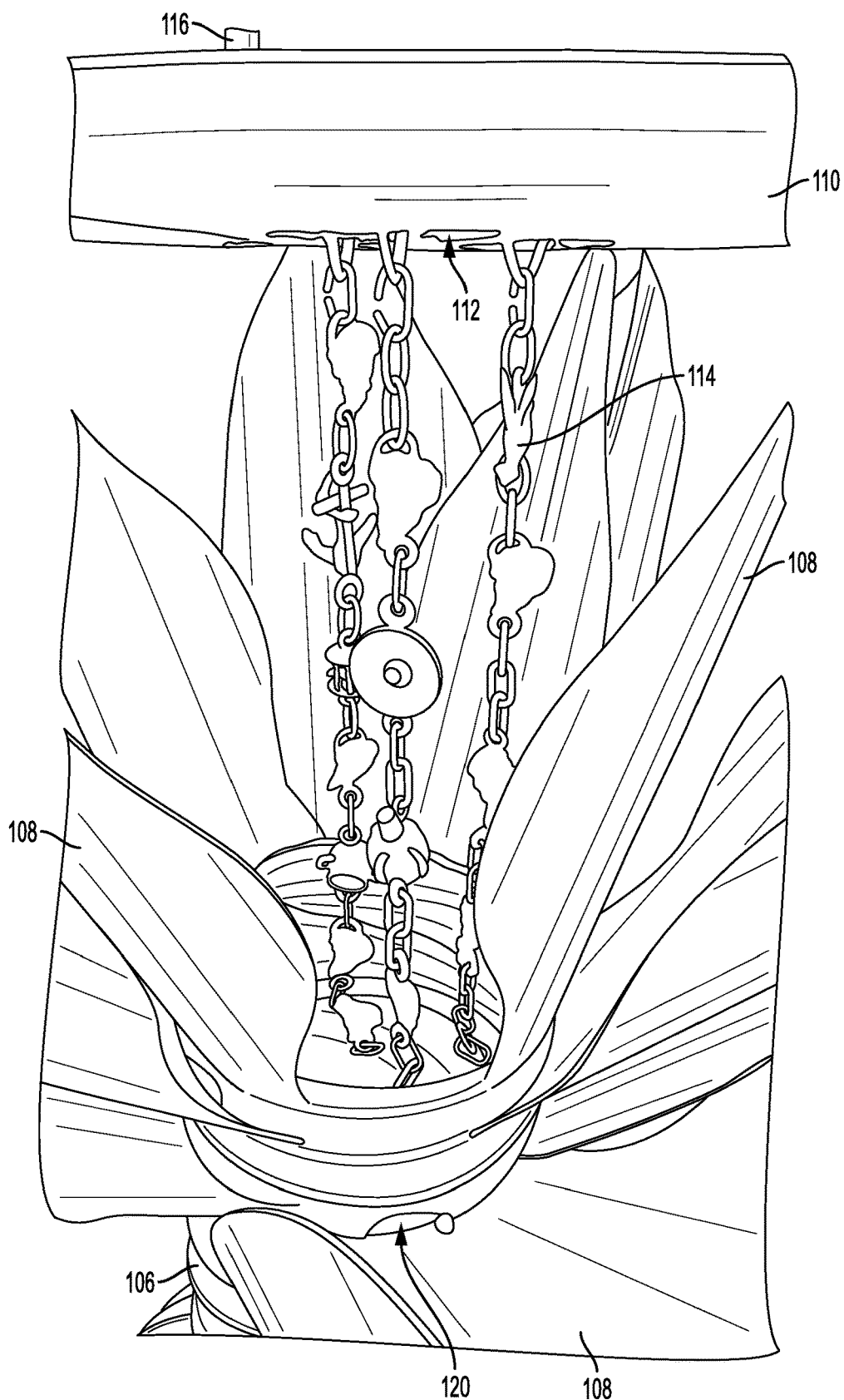
FIG. 4 is another perspective view of a portion of a rain collecting sculpture in accordance with the subject disclosure, zoomed in over the petals.
Figure 5:
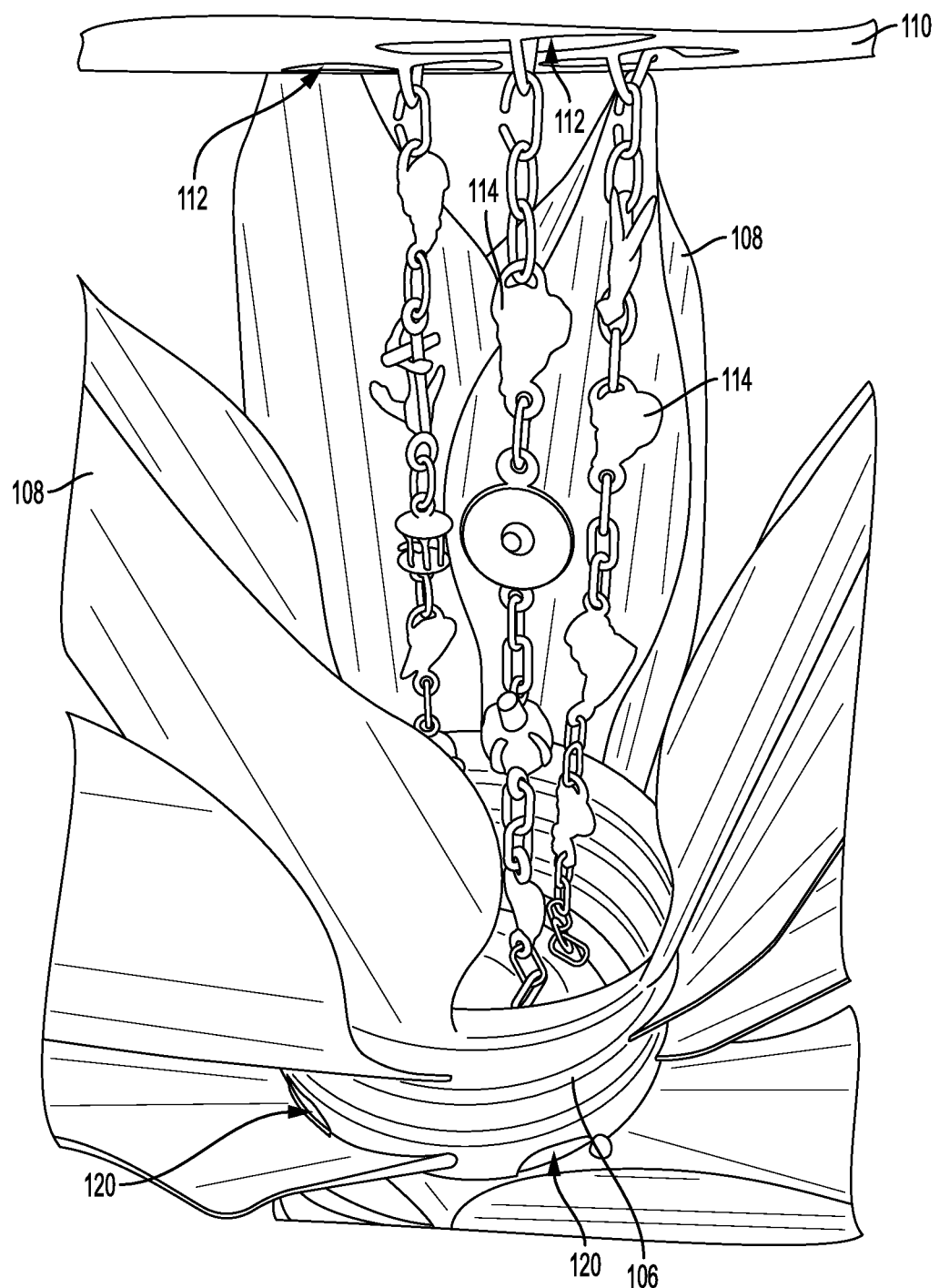
FIG. 5 is another perspective view of a portion of a rain collecting sculpture in accordance with the subject disclosure, zoomed in over the petals.
Figure 6:
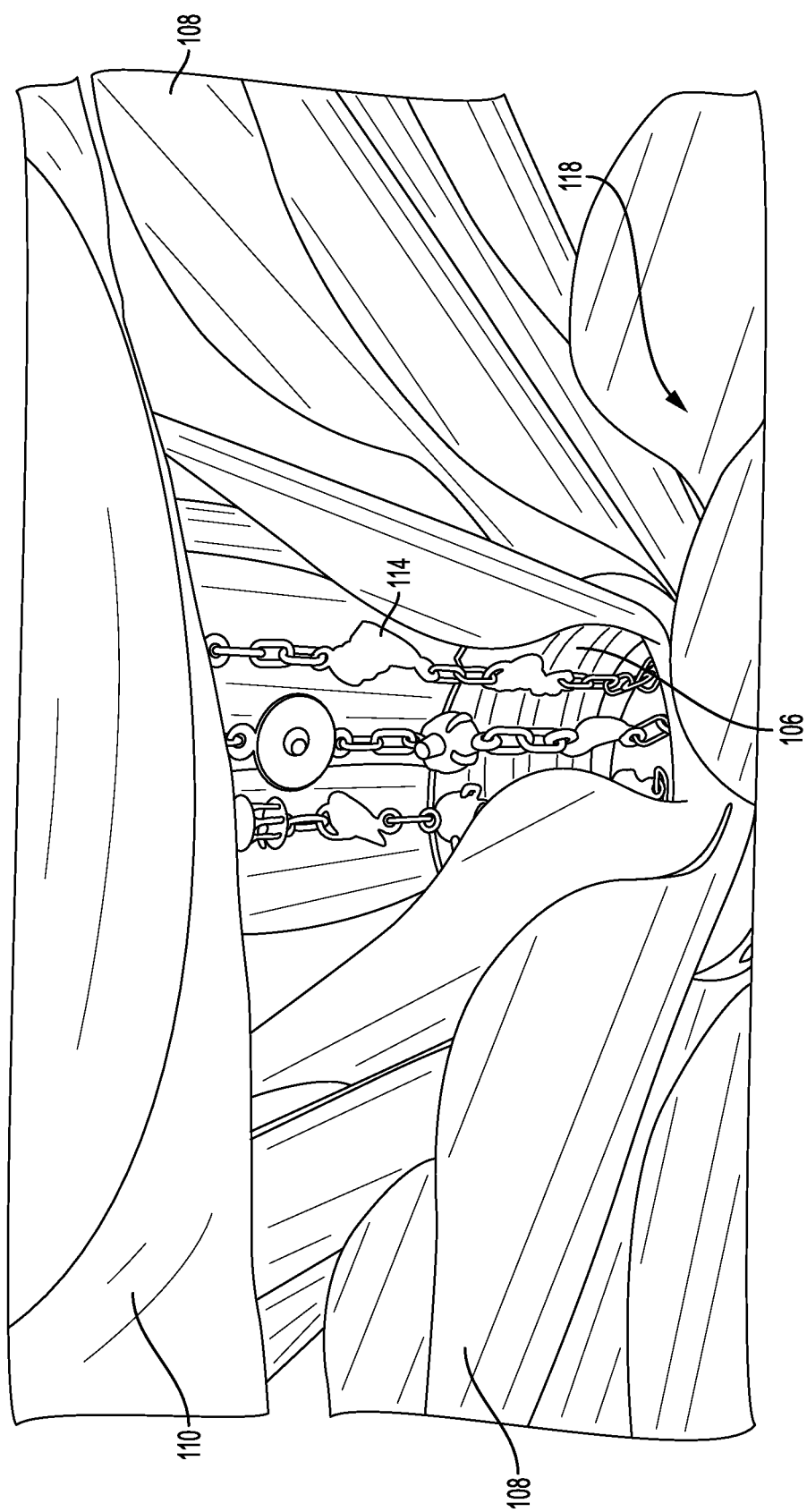
FIG. 6 is a perspective view of the upper surface member, rain chains, and petals of a rain collecting sculpture in accordance with the subject disclosure.
Figure 7:
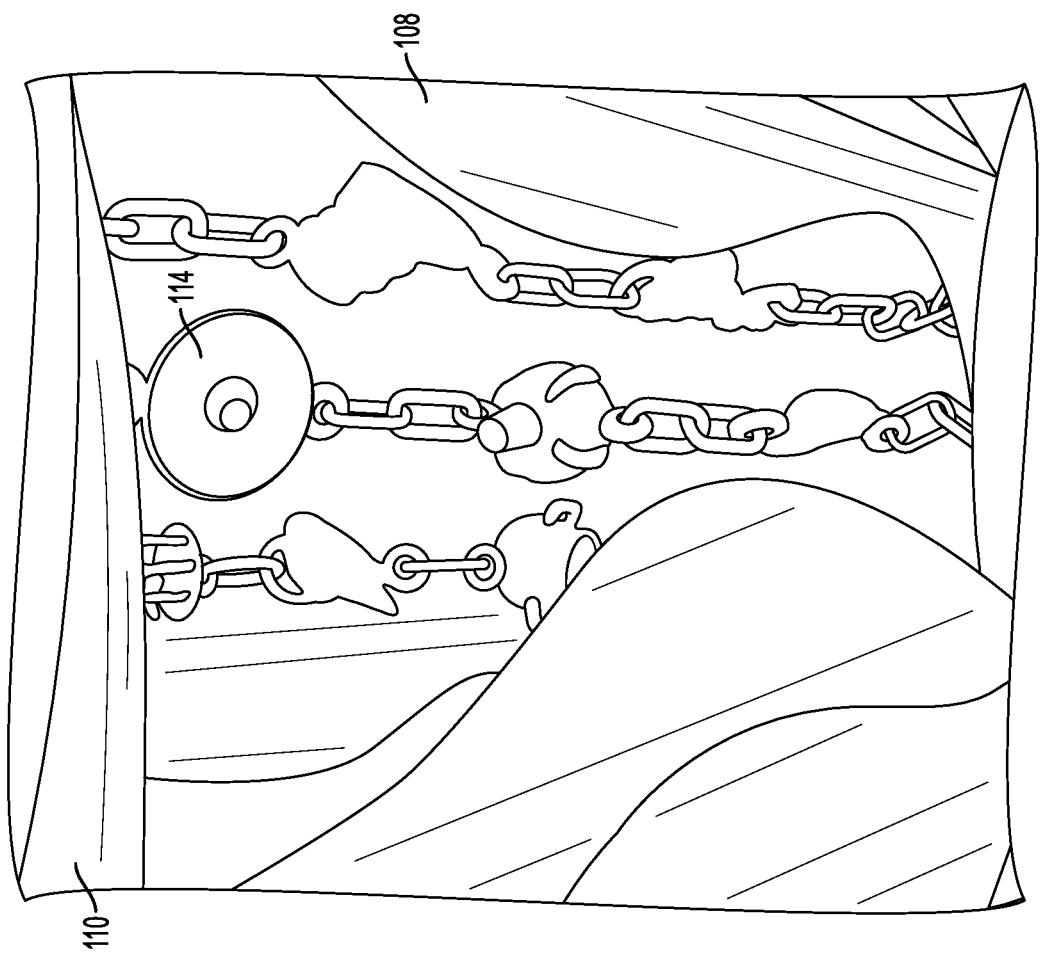
FIG. 7 is another perspective view of the upper surface member, rain chains, and petals of a rain collecting sculpture in accordance with the subject disclosure.

Referring now to FIGS. 1-2, perspective views of a rain collecting sculpture in accordance with the subject disclosure are shown generally at 100. The sculpture 100 has a base 102 which forms a water tight rainwater storage container. The base 102 rests stably on a level ground surface 10 and supports the rest of the rain collecting sculpture 100 in an upright position. In at least some embodiments, two or more welded steel braces (not shown) extend from a bottom of the base 102 and can be staked into soft ground, or bolted into a cement footing, to hold the sculpture 100 in place. As shown, the sculpture 100 is held in place by two base retaining walls 104a, 104b.

The sculpture 100 has a central longitudinal axis "a" which runs upwards from the ground surface 10. An elongated neck portion 106 runs along the central longitudinal axis "a" between the base 102 and a number of petal members 108. For ornamental purposes, three different petal shapes are used. However, one skilled in the art would understand that different shapes of petals can be implemented. An upper surface member 110 with a number of central holes 112 runs substantially perpendicular to the central longitudinal axis "a". The upper surface member 110 can be angled slightly downward towards the central holes 112. Three rain chains 114 hang from the upper support member 110, underneath the central holes 112, and run downward along the central longitudinal axis "a". Three guide arms 116 also extend upward from the upper surface member 110 along the central longitudinal axis "a". In other embodiments, the number of holes 112, rain chains 114, and guide arms 116, used may vary. For example, between one and ten holes 112, rain chains 114, and/or guide arms 116 have been found to be effective.

During a rain storm, rain falls from the sky and lands on the guide arms 116, upper surface 110, and pedal members 108. As rain strikes the guide arms 116 and upper surface member 110, rainwater is directed towards the central holes 112 within the upper surface member 110. Some rainwater also passes directly through the central holes 112. In some embodiments, the upper surface member 110 has a slight downward curvature of about 5-20% from outer tips 110a of the upper surface member 110 towards the central longitudinal axis "a". In this way, rainwater on the upper surface member 110 is routed into the central holes 112 to be directed into the elongated neck 106 either via the rain chains 114 or otherwise. Alternatively, in some embodiments, the upper member 110 is substantially level and rainwater simply runs off the upper surface member 110, either into the central holes 112 or onto the petal members 108, which then direct rainwater into the elongated neck 106. Rainwater directed into the elongated neck 106 is then directed into the base 102 for collection and storage. In embodiments, a screen (not shown) is located inside the elongated neck 106 to prevent debris, mosquitoes, animals and such from entering the base 102. The screen is easily accessible through the elongated neck 106, and thus, is designed to be easily removed to be cleaned and re-inserted.

Referring now to FIGS. 2-7, the petal members 108 are angled, sloping downward from outer tips 108a of the petal members 108 towards the central longitudinal axis "a". In this way, water that falls on top of a petal member 108 between the outer tips 108a and the central longitudinal axis "a" will be directed towards the central longitudinal axis "a". Further, the petal members 108 form channels 118 with a semi-circular curvature of up to 180 degrees to prevent water from spilling over the sides of the petal members 108. In this way, the petal members 108 are able to effectively direct rainwater towards the central longitudinal axis "a" without spillage. As the petal members 108 approach the central longitudinal axis "a", they terminate just outside the elongated neck 106. The elongated neck 106 has a series of side holes 120 which are aligned with individual petal members 108. This causes rainwater running down the petal members 108 to spill into the elongated neck 106, which in turn directs the rainwater into the base 102 for collection and storage. Alternatively, or additionally, the petals 108 may travel completely into the elongated neck 106 and contain bottom holes (not shown), such that water enters the elongated neck 106 by spilling through the bottom holes of the petals 108.

In this fashion, the petal members 108 and upper surface members 110 are able to direct rainwater falling within a wide area into the elongated neck 106. Without the petals 108 and the upper surface members 110, the elongated neck 106 would only receive rainwater falling in a small area around the central longitudinal axis "a". By contrast, the petals 108 and upper surface member 110 extend far outside the area covered by the opening in the top of the elongated neck 106, directing rainwater falling over a wide area into the neck 106, as described above.

Referring now to FIGS. 3-7, zoomed in perspective views of the sculpture 100 are shown. As described above, the petals 108 slope downwards towards the central longitudinal axis "a." Rainwater traveling along the petals 108 towards the central longitudinal axis "a" passes through the holes 120 in the elongated neck 106. Further, the rain chains 114 extend between the upper surface member 110 into the elongated neck 106. In this way, rainwater is directed into the elongated neck 106, and in turn, into the base 102 for storage.

Referring back to FIG. 1, when rainwater is directed into the base 102, the base 102 is able to store the rainwater. At some point, a user may desire to use the collected rainwater. Therefore, in the embodiment shown, the base 102 has a spigot 122 which can be used to release the collected rainwater for use. The spigot 122 has a male thread end, similar to the type that typically comes off a house for the purpose of connecting a house water supply to a garden hose 124. Thus, in the embodiment shown, a garden hose 124 can be firmly connected to the spigot 122, putting the garden hose 124 in fluid connection with the collected rainwater within the base 102. The collected rainwater can then be dispersed, through the garden hose 124, for a user's desired purposes, such as watering plants or storage within another container. Further, in other embodiments, the base 102 may have other fixtures which enable a user to access collected rainwater, such as a hole with a plug 102a, or a water pipe with a valve 102b, for example.

The various components of the rain collection sculpture 100 can be formed by structural materials sufficient to withstand the effects of the elements, the weight of the other structural elements, and the weight of any rainwater which the sculpture 100 may collect. For example, in some embodiments, the entire sculpture 100 is made with various kinds of metal, such as stainless steel or aluminum.

A water tight holding tank of the base 102 can be formed, at least in part, by welding together parts made with HEL-COR® CMP, sold by Contech Engineered Solutions, headquartered at 9025 Centre Pointe Drive, West Chester, Ohio 45069. A hollow cylinder for the base 102 can be formed with HEL-COR® CMP and the two steel retaining walls 104a, 104b can be welded on either side of the cylinder to form the water tight base 102. The elongated neck 106 can also be formed with HEL-COR® CMP pipe.

The petal members 108 can be cut using a computer numerical control (CNC) laser cutting program and then formed and given a curvature using rolling and pressing machines. The petal members 108 can then be welded onto the elongated neck 106. The rain chains 114 can be made out of solid brass chain links and cast bronze imagery using the "lost wax" casting technique. More generally, the "lost-wax process," also called cire-perdue, is a method of metal casting in which a molten metal is poured into a mold that has been created by a wax model. Once the mold is made, the wax model is melted and drained away.

The upper surface member 110 can be formed from metal and sprayed with industrial strength iron oxide red metal anti-corrosion primer rust proof paint, such as sold by Huisins New Material Technology Co., Limited, located at NO 547 Xicha Road, Baiyun District, Guangzhou, China. The upper surface member 110 can then be welded into place.

It is envisioned that many modifications to the subject technology are possible. For example, different numbers of petal members 108, and different shapes, sizes, and curvatures of petal members 108 and upper support member(s) 110 could be used. Further, multiple and/or different sized base(s) 102 and/or neck(s) 106 could be used. It would be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., assemblies, coupling parts and the like) shown as distinct for purposes of illustration may be incorporated within other functional elements in a particular implementation. With respect to the claims, any or all of the claims may be rearranged to depend from any or all of the other claims in any arrangement.

What is claimed is:

1. An apparatus comprising:
   a base member having opposing retaining walls, the base member providing a support structure, the base member configured to store collected rainwater;
   an elongated neck member linked to and extending perpendicularly from the base member;
   petal members linked to a top of the elongated neck member, the elongated neck member being tubular in shape and running along a central longitudinal axis between the base member and the petal members; and
   an upper surface member positioned above the petal members, the upper surface member running perpendicular to the central longitudinal axis and having central holes.

2. The apparatus of claim 1 wherein the upper surface member is angled slightly downward towards the central holes.

3. The apparatus of claim 2 further comprising rain chains hanging from the upper surface member, underneath the central holes, running downward along the central longitudinal axis.

4. The apparatus of claim 3 further comprising guide arms extending upward from the upper surface member along the central longitudinal axis.

5. An apparatus comprising:
   a base forming a rainwater storage container;
   an elongated neck portion being tubular in shape and running along a central longitudinal axis and capable of directing rainwater into the base;
   petal members forming channels for directing rainwater towards the central longitudinal axis and into the elongated neck;
   an upper surface member running perpendicular to the central longitudinal axis and having central holes;
   guide arms extending upward from the upper surface member along the central longitudinal axis for directing rainwater towards the surface of the upper surface member; and
   at least one rain chain running along the central longitudinal axis between the upper surface member and the elongated neck to direct rainwater into the elongated neck.

6. The apparatus of claim 5 wherein the base includes at least one garden hose hookup.

7. The apparatus of claim 5 wherein the base further includes a hole with a plug.

8. The apparatus of claim 5 wherein the base further includes a water pipe with a valve.

9. The apparatus of claim 5 wherein the central holes enable rainwater to pass through the upper surface member.

* * * * *